(12) United States Patent
Adler et al.

(10) Patent No.: US 10,666,587 B1
(45) Date of Patent: May 26, 2020

(54) MEDIA ENHANCEMENT SYSTEM

(71) Applicant: Snap Inc., Santa Monica, CA (US)

(72) Inventors: Manny Jerrold Adler, Malibu, CA (US); Jonathan Brody, Marina Del Rey, CA (US); Nathan Kenneth Boyd, Los Angeles, CA (US); Glenne Christiaansen, Beverly Hills, CA (US); Kirk Ouimet, Orem, UT (US); Kameron Sheffield, South Jordan, UT (US); Haibo Zhao, Redondo Beach, CA (US); Zhuangtian Zhao, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/116,620

(22) Filed: Aug. 29, 2018

(51) Int. Cl.
*H04L 12/58* (2006.01)
*H04W 4/14* (2009.01)

(52) U.S. Cl.
CPC ............ *H04L 51/046* (2013.01); *H04L 51/08* (2013.01); *H04L 51/10* (2013.01); *H04W 4/14* (2013.01)

(58) Field of Classification Search
CPC ....... H04L 51/046; H04L 51/10; H04L 51/08; H04L 51/04; H04L 51/18; H04L 51/043
See application file for complete search history.

(56) References Cited

U.S. PATENT DOCUMENTS

| | | | | |
|---|---|---|---|---|
| 9,342,829 B2* | 5/2016 | Zhou | ................ | G06Q 30/02 |
| 9,477,374 B1* | 10/2016 | Snabl | ................ | H04L 51/10 |
| 9,922,226 B1* | 3/2018 | Boyd | ................ | G06K 7/1456 |
| 10,348,658 B2* | 7/2019 | Rodriguez | ........ | H04L 65/1093 |
| 10,476,827 B2* | 11/2019 | Lieb | ................ | H04L 51/18 |
| 2004/0221224 A1* | 11/2004 | Blattner | .......... | H04L 12/1822 715/201 |
| 2012/0072856 A1* | 3/2012 | Park | ................ | H04L 51/043 715/752 |
| 2013/0275525 A1* | 10/2013 | Molina | ........... | H04L 51/10 709/206 |
| 2015/0163189 A1* | 6/2015 | Proctor | ........... | G06F 16/248 715/753 |
| 2016/0042404 A1* | 2/2016 | Joshi | ................ | H04L 63/102 705/14.55 |
| 2016/0048306 A1* | 2/2016 | Weil | ................ | H04L 51/10 715/726 |
| 2016/0080296 A1* | 3/2016 | Lewis | ............... | H04L 51/08 715/752 |
| 2017/0195269 A1* | 7/2017 | Miklos | ........... | G06Q 10/107 |
| 2018/0039621 A1* | 2/2018 | Sronce | ........... | H04L 51/046 |
| 2018/0077096 A1* | 3/2018 | DeMattei | ........ | H04L 51/10 |
| 2018/0356957 A1* | 12/2018 | Desjardins | ...... | G06F 3/04817 |
| 2018/0373683 A1* | 12/2018 | Hullette | .......... | G06Q 50/01 |

* cited by examiner

*Primary Examiner* — Magdi Elhag
(74) *Attorney, Agent, or Firm* — Schwegman Lundberg & Woessner, P.A.

(57) ABSTRACT

Embodiments of the present disclosure relate generally to systems for enhancing a first media item through the addition of a supplemental second media item. A user may provide a request to enhance a selected media item, and in response, an enhancement system retrieves and presents a curated collection of supplemental content to be added to the media, to the user. The user may review the curated collection of supplemental content, for example by providing a tactile input to scroll through the curated collection of content.

20 Claims, 14 Drawing Sheets

400 

```
┌─────────────────────────────────────────────────┐
│ CAUSING DISPLAY OF A FIRST MEDIA ITEM WITHIN A  │
│              GRAPHICAL USER INTERFACE           │
│                        402                      │
└─────────────────────────────────────────────────┘
                         │
                         ▼
┌─────────────────────────────────────────────────┐
│ RECEIVING A REQUEST TO AUGMENT THE FIRST MEDIA  │
│ ITEM, THE REQUEST COMPRISING A SELECTION OF A   │
│               SECOND MEDIA ITEM                 │
│                        404                      │
└─────────────────────────────────────────────────┘
                         │
                         ▼
┌─────────────────────────────────────────────────┐
│ GENERATING A COMPOSITE MEDIA ITEM BASED ON THE  │
│ FIRST MEDIA ITEM AND THE SECOND MEDIA ITEM, THE │
│ COMPOSITE MEDIA ITEM COMPRISING A PRESENTATION  │
│ OF THE FIRST MEDIA ITEM THAT INCLUDES A DISPLAY │
│ OF A GRAPHICAL ICON THAT REPRESENTS THE SECOND  │
│ MEDIA ITEM AT A LOCATION WITHIN THE FIRST MEDIA │
│                        ITEM                     │
│                        406                      │
└─────────────────────────────────────────────────┘
                         │
                         ▼
┌─────────────────────────────────────────────────┐
│ CAUSING DISPLAY OF THE COMPOSITE MEDIA ITEM AT  │
│                 A CLIENT DEVICE                 │
│                        408                      │
└─────────────────────────────────────────────────┘
```

GENERATING AN AUDIO FILE THAT COMPRISES AUDIO DATA AND AN IDENTIFIER THAT IDENTIFIES THE AUDIO FILE
802

ADDING THE AUDIO FILE TO THE COLLECTION OF MEDIA ITEMS IN RESPONSE TO THE GENERATING THE AUDIO FILE
804

PRESENTING THE IDENTIFIER THAT IDENTIFIES THE AUDIO FILE AMONG THE COLLECTION OF MEDIA ITEMS
806

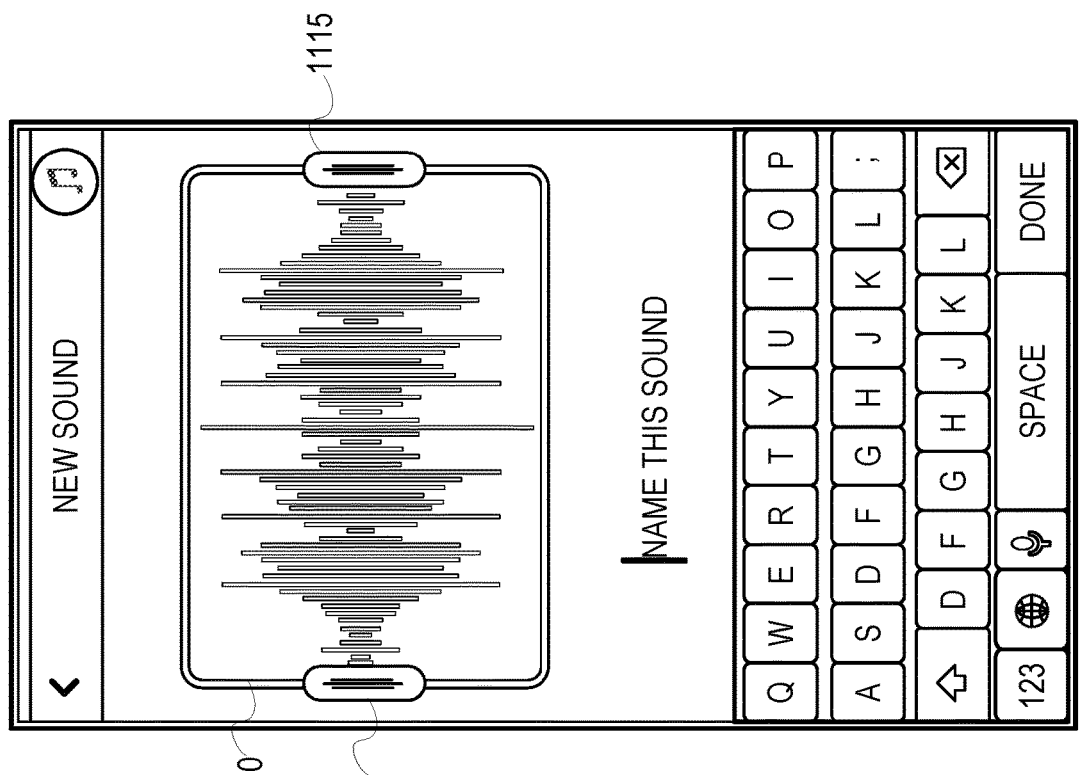
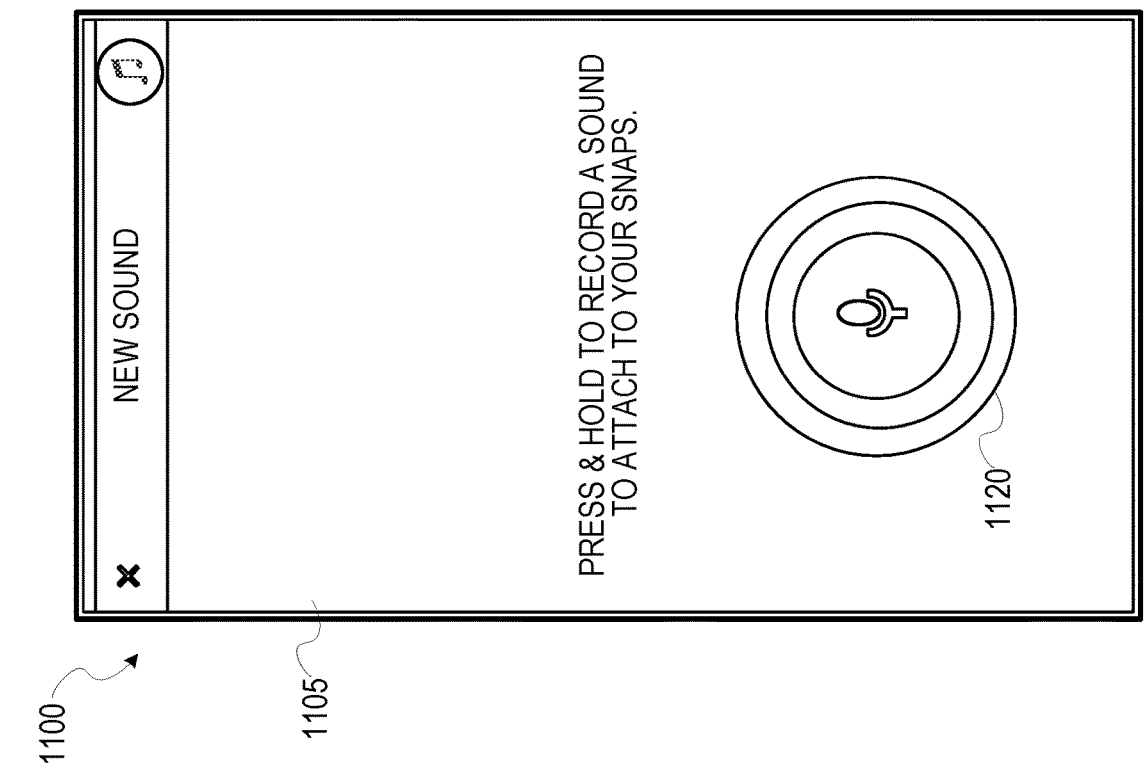
FIG. 11

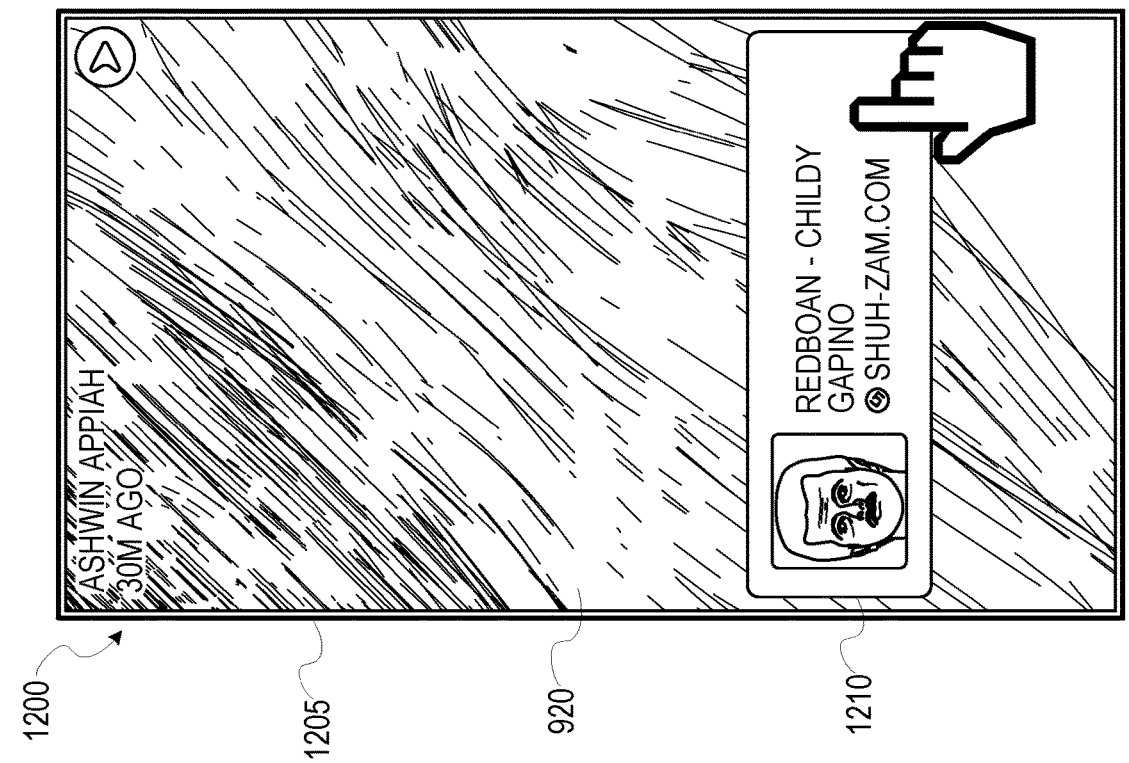
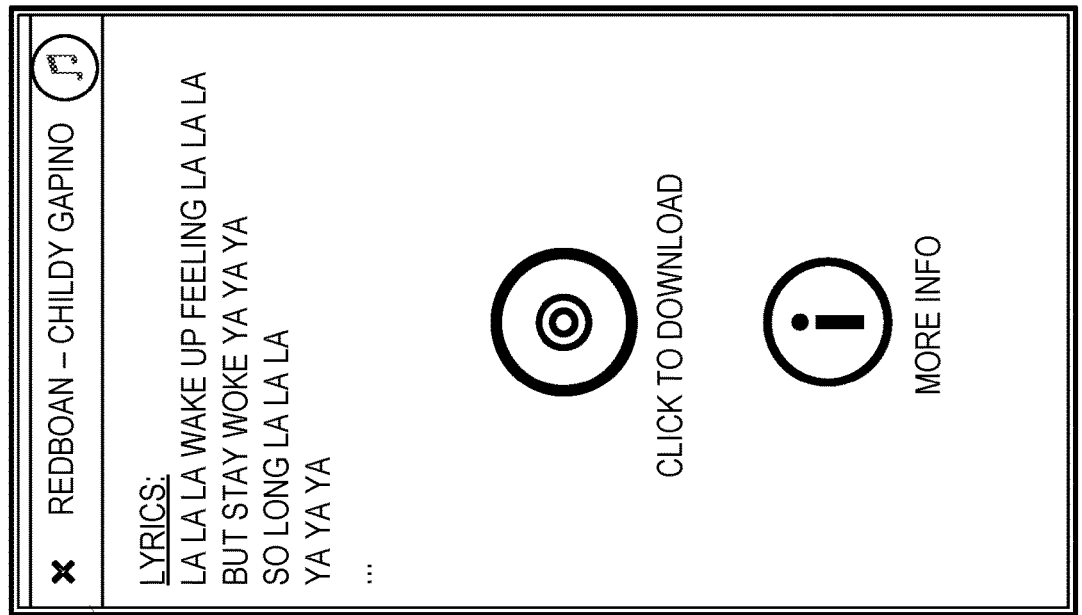
FIG. 12

US 10,666,587 B1

MEDIA ENHANCEMENT SYSTEM

TECHNICAL FIELD

Embodiments of the present disclosure relate generally to messaging services, and more particularly, to systems for augmenting media content to be distributed in messages.

BACKGROUND

Early forms of text messaging and instant messaging applications were limited to sending and receiving strings of text. As such applications increased in popularity, and innovations in related fields advanced, features were added to such messaging applications to enable users to send text as well as media content, such as images.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for augmenting media content, according to certain example embodiments.

FIG. 11 is an interface diagram depicting a graphical user interface to generate an audio file, according to certain example embodiments.

FIG. 12 is an interface diagram depicting composite media generated by an enhancement system, based on a first media and a second media, according to certain example embodiments.

DETAILED DESCRIPTION

Figure 1:
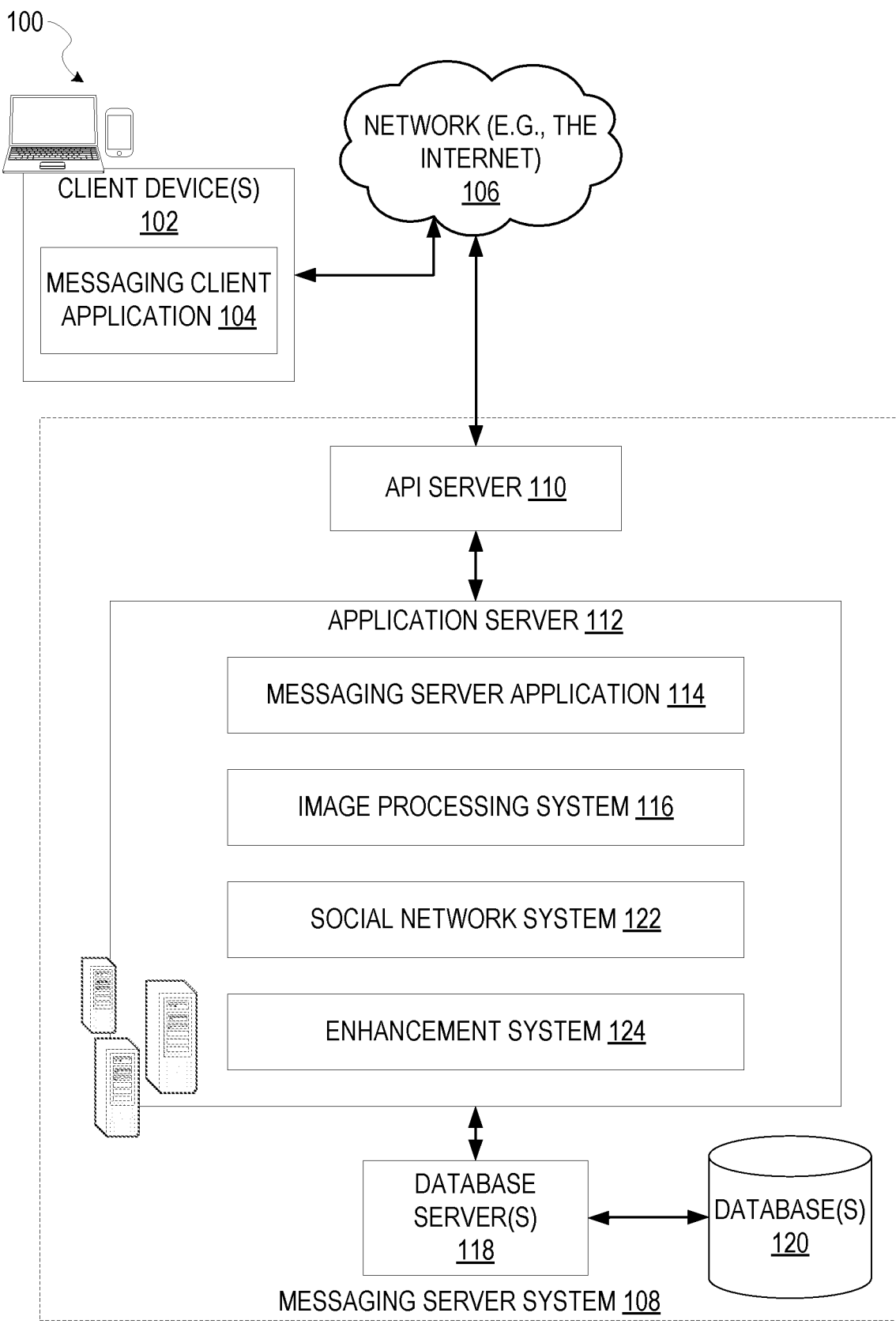
FIG. 1 is a block diagram showing an example messaging system for exchanging data (e.g., messages and associated content) over a network in accordance with some embodiments, wherein the messaging system includes a enhancement system.

Messaging applications provide interfaces to enable users to communicate with one another by sharing text as well as various forms of media content, such as pictures and video clips. The system disclosed herein provides an enhanced graphical user interface to receive inputs to augment certain forms of media distributed through a messaging application, by enhancing the media with supplementary media content that includes audio files. For example, a user may add a media item that includes audio, such as a portion of a song or previously generated recording, to a picture or video to be distributed via a message. The disclosed system may additionally augment the picture or video by adding a graphical icon that represents and identifies the audio added to the media item.

Embodiments of the present disclosure relate generally to systems for enhancing a first media item through the addition of a supplemental second media item. A user may provide a request to enhance a selected media item (e.g., a first media item), and in response, an enhancement system retrieves and presents a curated collection of supplemental content that may be added to a presentation of the first media item, to the user. The user may review the curated collection of supplemental content, for example by providing a tactile input to scroll through the curated collection of content. In some embodiments, the curated collection of supplemental content may comprise audio files that include songs, audio recordings, and/or sound clips.

In some embodiments, the enhancement system may automatically curate the collection of content based on one or more context factors that include: user profile data of the user, temporal considerations (e.g., time of day, day, month, season), location data, user profile data, as well as attributes of the first media item. For example, in response to receiving the request to augment the first media item, the enhancement system may, in an automated operation, determine one or more context factors, and curate the collection of media content based on the context factors.

A user may thereby review and select one or more media items from among the curated collection based on an input that identifies and selects a media item. Responsive to receiving an identification of a media item from among the curated collection of supplemental content, the system retrieves, or generates on the fly, a sample of the identified media item. For example, the sample may comprise a portion of an audio recording, such as the first 15 seconds. The media enhancement system presents the sample of the media item to the user within the GUI.

In further embodiments, a user may provide an input to generate their own media items to be added to the curated collection of supplemental media content. In response to receiving the input, the enhancement system may present an audio recording interface to enable a user to record audio data and provide an identifier to label the audio data. In some embodiments, the enhancement system may further provide a display of an assortment of audio filters and effects to enable the user to further customize the audio data recorded (e.g., speed up, slow down, change pitch, etc.). In response to receiving the recording of the audio data, the enhancement system may add the recording of the audio data to the curated collection of supplemental content, to be displayed within the graphical user interface.

In response to receiving a selection of the media item (e.g., a second media item) from among the curated collection of supplemental content, the enhancement system generates a composite media item based on the first media item and the second media item. For example, the composite media item may comprise a presentation of the first media item (e.g., a picture or video), that includes a display of a graphical icon that represents the second media item at a position overlaid upon the first media item. The graphical icon may provide an identification of the second media item (e.g., display of a song title, or album artwork from a particular musical album that corresponds with the second media item).

In some embodiments, the graphical icon may be associated with a Uniform Resource Locator (URL) associated with the second media item. For example, the URL may reference a resource such as a website associated with the second media item. In response to receiving a selection of the graphical icon, the enhancement system may present further content associated with the second media item (e.g., by navigating a browser to the URL).

In some embodiments, the user may provide an input to edit or alter the supplemental media item. For example, in response to receiving the selection of the media item, the enhancement system may present an audio editing interface that comprises a visualization of audio data associated with the second media item (e.g., a waveform). In such embodiments, the user may provide one or more inputs to select portions of the audio data (e.g., by selecting segments of the waveform, or by identifying timestamps). In response, the enhancement system alters the selected media data before associating with the first media item.

Upon generating the composite media based on the first media item and the second media item, the enhancement system may present an interface to enable a user to distribute the composite media item to one or more identified recipients in a message (e.g., text message, email, ephemeral message). Recipients of the message may access and view the composite media at a respective client device.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a enhancement system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
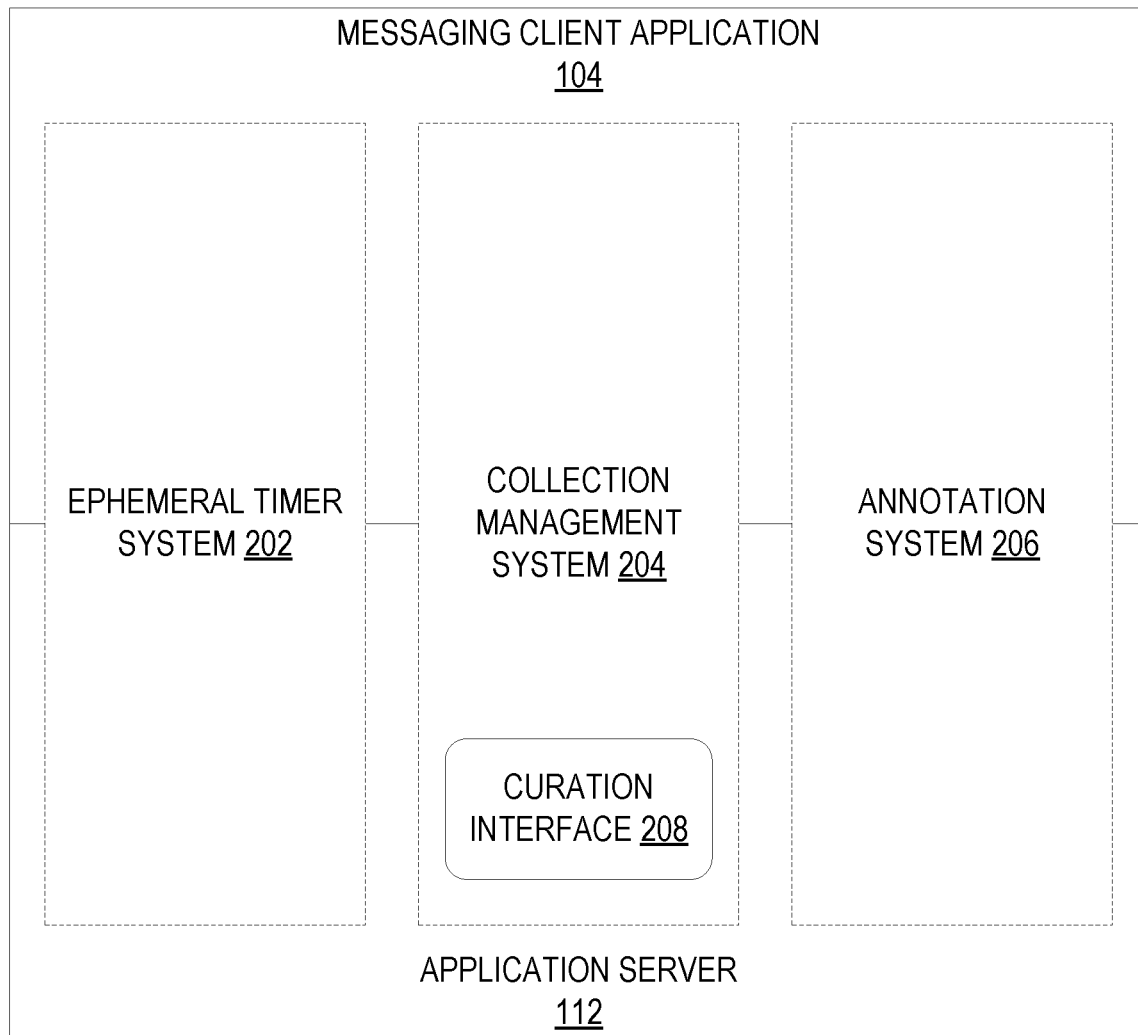
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models and image filters. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
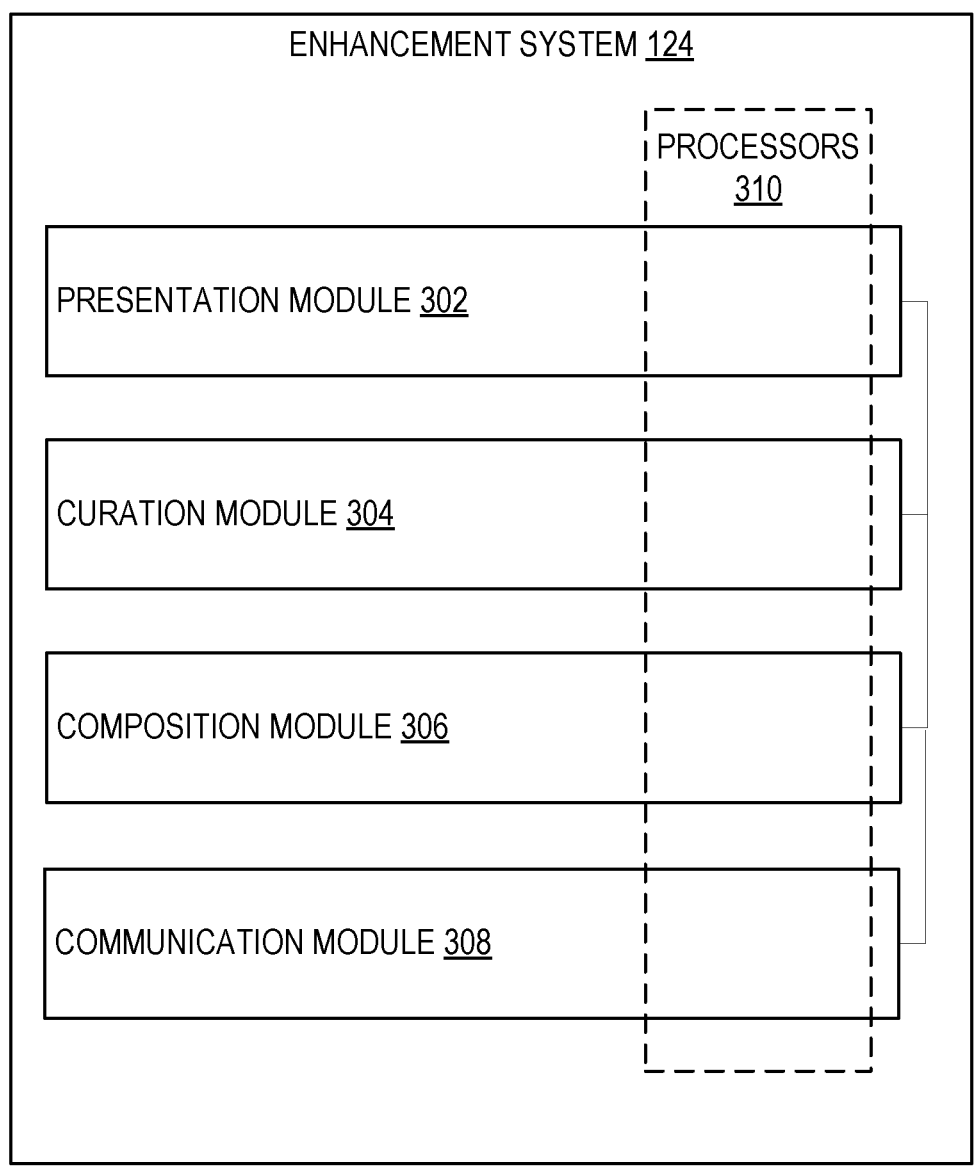
FIG. 3 is a block diagram illustrating various modules of a enhancement system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the enhancement system 124 that configure the enhancement system 124 to: display a first media item that includes an image or video; receive a request to augment the first media item, wherein the request comprises a selection of a second media item that includes audio data; generate a composite media based on the first media item and the second media item; and to cause display of the composite media within a GUI, according to some example embodiments. The enhancement system 124 is shown as including a presentation module 302, a curation module 304, a composition module 306, and a presentation communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the enhancement system 124 may physically include an arrangement of one or more of the processors 308 (e.g., a subset of or among the one or more processors of the machine) configured to perform the operations described herein for that module. As another example, any module of the enhancement system 124 may include software, hardware, or both, that configure an arrangement of one or more processors 310 (e.g., among the one or more processors of the machine) to perform the operations described herein for that module. Accordingly, different modules of the enhancement system 124 may include and configure different arrangements of such processors 310 or a single arrangement of such processors 310 at different points in time. Moreover, any two or more modules of the enhancement system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for augmenting media content, according to certain example embodiments. Operations of the method 400 may be performed by the modules described above with respect to FIG. 3. As shown in FIG. 4, the method 400 includes one or more operations 402, 404, 406, and 408.

At operation 402, the presentation module 302 causes display of a first media within a graphical user interface (GUI). A user of a client device 102 may provide a request to generate a message that includes the first media. The first media may be selected from a collection of media items, or may be captured and uploaded to the enhancement system 124 (e.g., via an input device of the client device 102).

For example, a user of the client device 102 may select or capture an image and display the image within the GUI within a message composition interface. The message composition interface may for example comprise a presentation of the image, along with a set of enhancement options which the user may select to alter or enhance the selected image. In some embodiments, as discussed herein, the enhancement options may include an option to add audio, such as a song, to the image, such that causing display of the image also simultaneously causes a device to play the audio that was added to the image.

At operation 404, the communication module 308 receives a request to enhance the first media, wherein the request includes a selection of a second media (e.g., audio data). For example, the presentation module 302 may cause display of a presentation of the first media within a GUI, wherein the presentation of the first media includes a display of a set of enhancement options (e.g., the enhancement options 910 of FIG. 9) overlaid upon the first media. Responsive to receiving a selection of one or more of the enhancement options, the communication module 308 causes the presentation module 302 to display a set of corresponding enhancement options within the GUI (e.g., the audio options 1005 of FIG. 10).

For example, the set of enhancement options may include an options to add audio to an image or video. In response to receiving a selection of an option that corresponds to adding audio to the image or video, the presentation module 302 causes display of a collection of media items (i.e., identifiers of songs or audio recordings).

At operation 406, in response to receiving a selection of a second media from among the collection of media items displayed within the GUI, the composition module 306 generates a composite media based on the first media and the second media. In some embodiments, the composite media may comprise a presentation of the first media (e.g., an image or video), that includes a display of a graphical icon overlaid at a position upon the first media that represents the second media. For example, the graphical icon may comprise a display of an identifier associated with the second media, such as a name of an artist, or album artwork.

At operation 408, the presentation module 302 causes display of the composite media at a client device, such as the client device 102. In response to causing display of the composite media at a client device, the presentation module 302 may access the second media (i.e., the audio data), and play the corresponding audio in conjunction with the display of the composite media.

Figure 5:
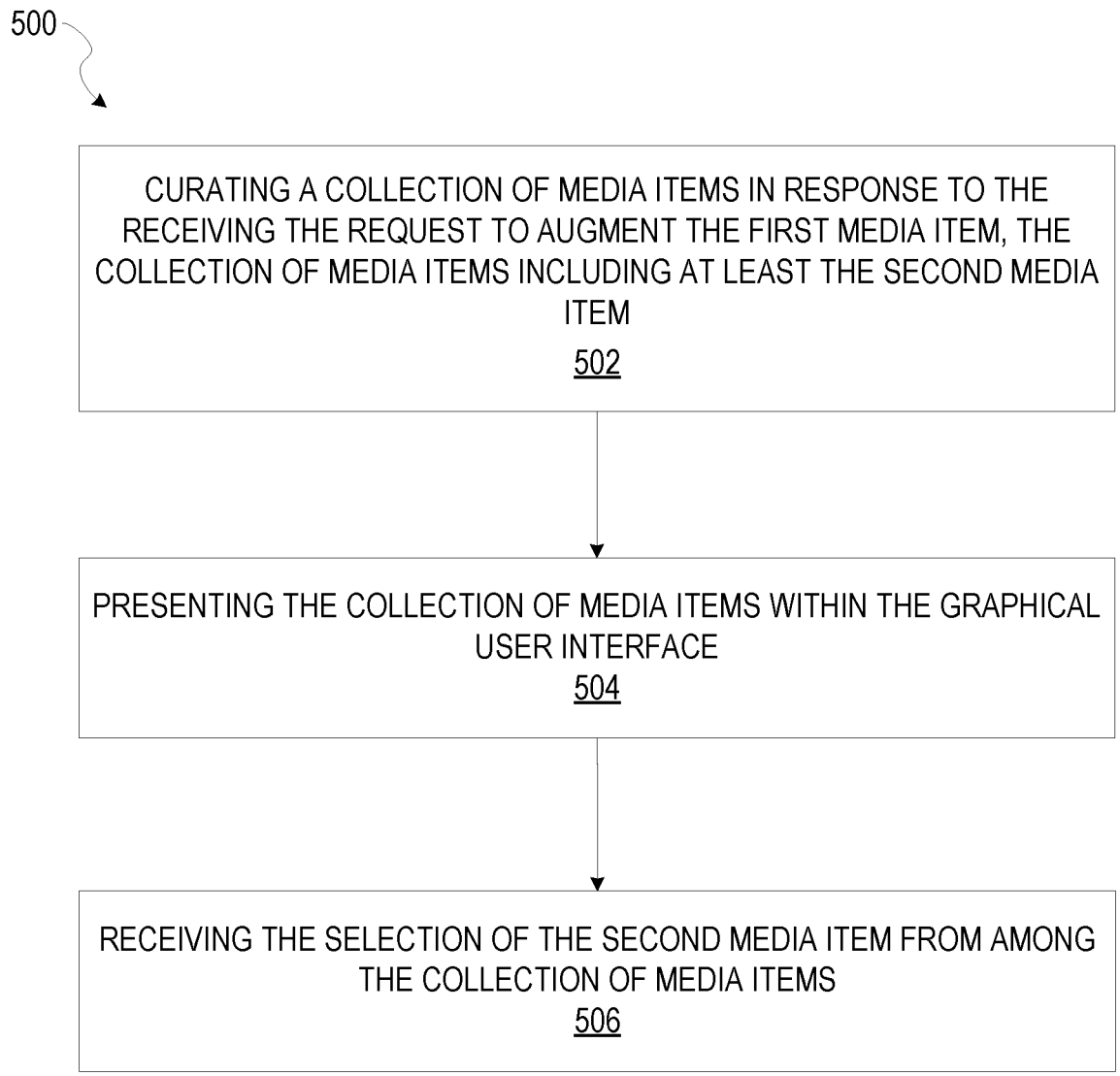
FIG. 5 is a flowchart illustrating a method for augmenting media content, according to certain example embodiments.

FIG. 5 is a flowchart illustrating a method 500 for augmenting media content, according to certain example embodiments. Operations of the method 500 may be performed by the modules described above with respect to FIG. 3. As shown in FIG. 5, the method 500 includes one or more operations 502, 504, and 506. In some embodiments, the method 500 may be performed as a portion of (e.g., a subroutine) operation 404 of the method 400.

At operation 502, the curation module 304 curates a collection of media items in response to receiving the request to enhance the first media (operation 404), wherein the curated collection of media items includes at least the second media. In some embodiments, the curation module 304 may curate the collection of media items based on one or more context factors that includes: user profile data of the requesting user; geolocation data that identifies a location of the user (i.e., the location of the client device); temporal data (e.g., that indicates a time, a day, a month, a season, etc.); as well as attributes of the first media.

At operation 504, in response to the curation module 304 curating the collection of media items, the presentation module 302 causes display of a presentation of the collection of media items within the GUI. In some embodiments, the collection of media items may be displayed as a scrollable list, such that a user may browse or review the collection of media items based on one or more tactile inputs directly into the GUI. At operation 506, a user may then select one of the media items (including the second media item) from among the presentation of the collection of media items.

Figure 6:
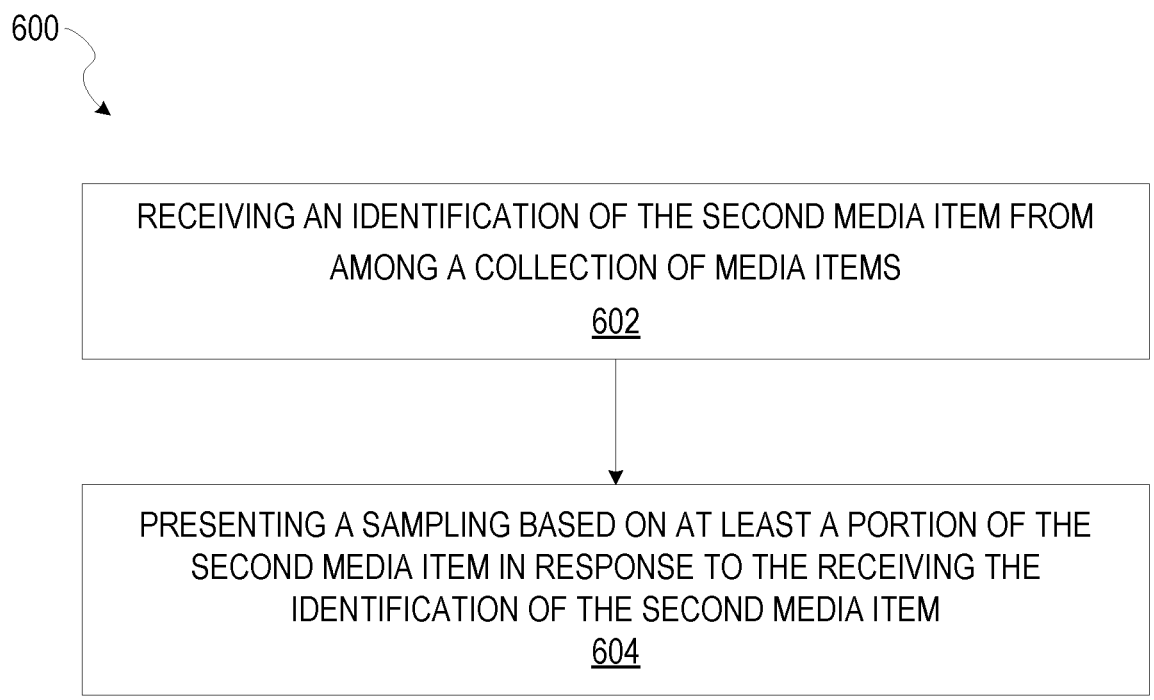
FIG. 6 is a flowchart illustrating a method for presenting a sample of media content in response to receiving an identification of the media content, according to certain example embodiments.

FIG. 6 is a flowchart illustrating a method 600 for presenting a sample of media content in response to receiving an identification of the media content, according to certain example embodiments. Operations of the method 600 may be performed by the modules described above with respect to FIG. 3. As shown in FIG. 6, the method 600 includes one or more operations 602 and 604. The method 600 may be performed as a portion (e.g., a subroutine) of operation 506 of the method 500.

At operation 602, the communication module 308 receives an identification of the second media item from among the curated collection of media items displayed within the GUI. For example, the identification may comprise scrolling the collection of media until the second media item is located at a particular position within the GUI, or simply by selecting the second media item through a tactile input.

At operation 604, in response to the communication module 308 receiving the identification of the second media item, the composition module 306 presents a sampling of the second media item. In some embodiments, the composition module 306 may generate the sampling on-the-fly, for example by simply playing a portion of the second media item (e.g., the first 15 seconds). In further embodiments, the composition module 306 may access a database 120 to retrieve a sample associated with the selection (i.e., the second media item).

Figure 7:
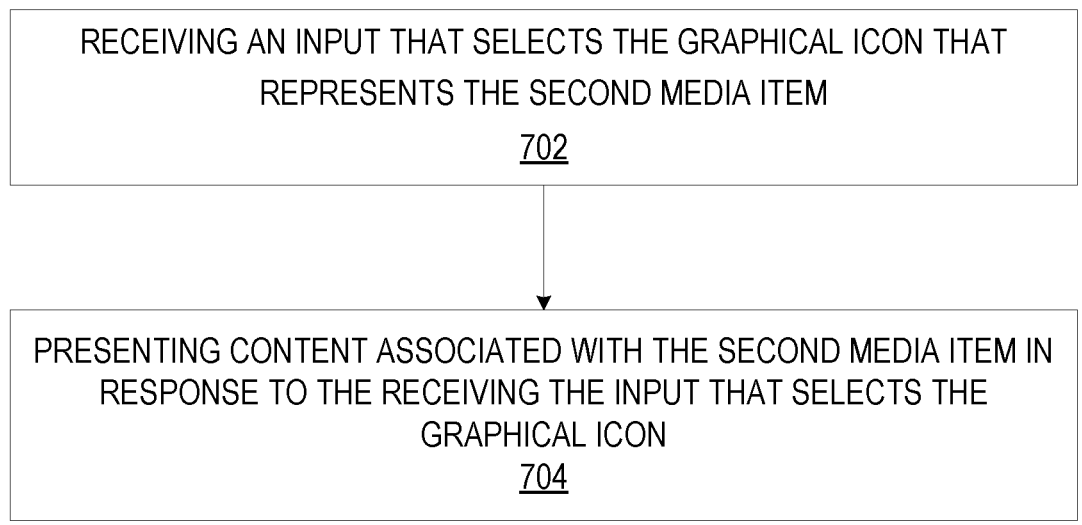
FIG. 7 is a flowchart illustrating a method for presenting content in response to receiving an input that selects a graphical icon displayed within composite media, according to certain example embodiments.

FIG. 7 is a flowchart illustrating a method 700 for presenting content in response to receiving an input that selects a graphical icon displayed within composite media, according to certain example embodiments. Operations of the method 700 may be performed by the modules described above with respect to FIG. 3. As shown in FIG. 7, the method 700 includes one or more operations 702 and 704.

At operation 702, the communication module 308 receives an input that selects a graphical icon that represents the second media from a presentation of the composite media. For example, as discussed in operation 406 of the method 400, and as seen in the illustrative example depicted by FIG. 12, the composition module 306 generates a composite media based on the first media and the second media, wherein the composite media comprises a presentation of the first media that includes a graphical icon that represents the second media at a location within the first media.

At operation 706, in response to receiving the input that selects the graphical icon that represents the second media, the communication module 308 retrieves content associated with the second media and displays the content within the GUI.

In some embodiments, the graphical icon may be associated with a URL that references a resource that comprises additional information associated with the second media (e.g., a website that includes a track listing, lyrics, purchase information, tour dates, etc.). For example, in response to receiving the selection of the graphical icon, the communication module 308 may launch a browser application, and navigate the browser application to a resource referenced by the URL associated with the graphical icon.

Figure 8:
FIG. 8 is a flowchart illustrating a method for adding content to a collection of media items, according to certain example embodiments.

FIG. 8 is a flowchart illustrating a method 800 for adding content to a collection of media items, according to certain example embodiments. Operations of the method 800 may be performed by the modules described above with respect to FIG. 3. As shown in FIG. 8, the method 800 includes one or more operations 802, 804, and 806.

At operation 802, the composition module 306 generates an audio file that comprises audio data and an identifier that identifies the audio file. For example, at operation 504 of the method 500 the presentation module 302 displays a presentation of the collection of media items within the graphical user interface. In some embodiments, the presentation of the collection of media items may additionally include a display of an option to create a new media item to add to the collection, as seen in the interface diagram 1000 depicted in FIG. 10. Responsive to receiving a selection of the option to create the new media item, the presentation module 302 causes display of an audio creation interface, as depicted in FIG. 11.

At operation 804, responsive to generating the audio file that comprises the audio data and the identifier that identifies the audio file, the curation module 304 adds the audio file to the collection of media items. In some embodiments, the audio file may be accessible by all user accessing or using the enhancement system 124, while in further embodiments, the audio file may only be accessed by a user that recorded the audio file, or social network connections of the user.

At operation 806, the presentation module 302 presents the identifier that identifies the audio file among the collection of media items within the GUI.

Figure 9:
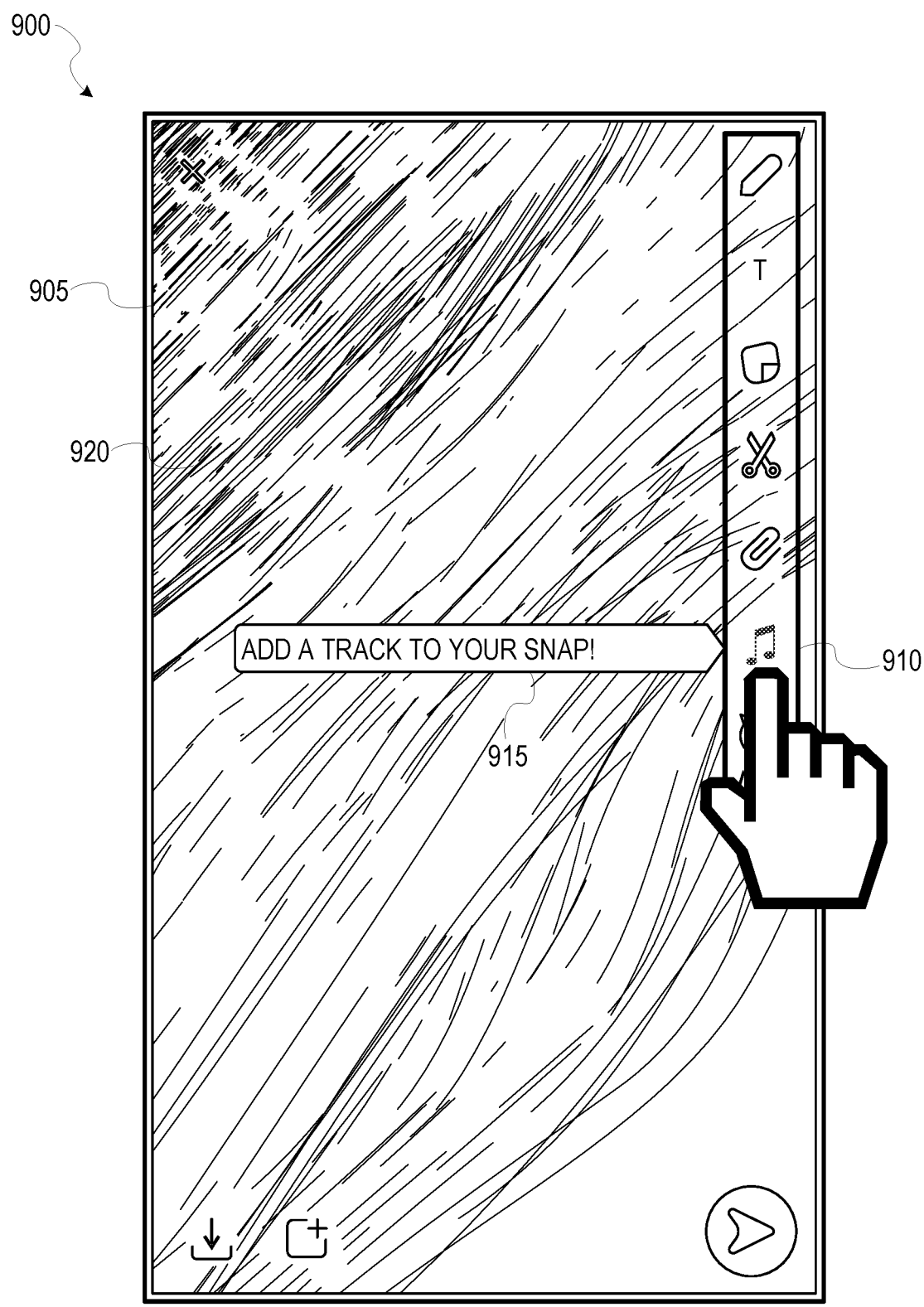
FIG. 9 is an interface diagram depicting a graphical user interface for augmenting media content, according to certain example embodiments.

FIG. 9 is an interface diagram 900 depicting a GUI 905 displayed on a client device 102, for enhancing media content, according to certain example embodiments. As seen in the interface diagram 900, the GUI 905 for enhancing media content comprises a presentation of a first media 920 (e.g., an image or video), wherein the presentation includes a display of a set of enhancement options 910.

In some embodiments, the presentation module 302 of the enhancement system 124 causes display of the first media 920 within the GUI 905 in response to receiving a request from the client device 102. For example, the request may include a request to generate a message that comprises a selection of the first media 920. In response to causing display of the first media 920, the presentation module 302 may additionally generate and display the set of enhancement options 910 within the GUI 905. The enhancement options 910 may for example comprises a set of tools that a user may use to enhance or modify the first media 920.

Figure 10:
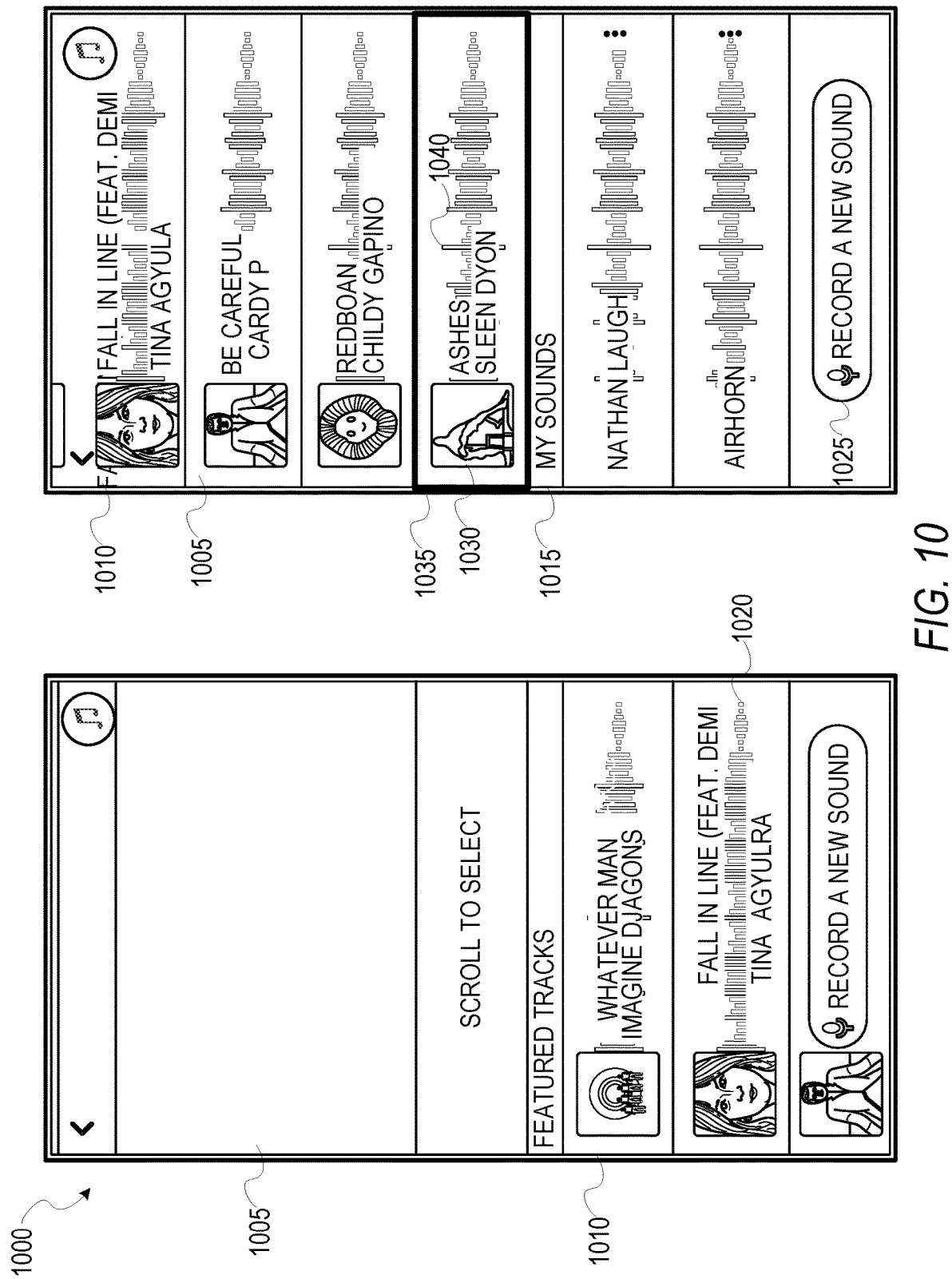
FIG. 10 is an interface diagram depicting a graphical user interface for augmenting media content that comprises a presentation of a collection of media items, according to certain example embodiments.

A user may provide an input selecting an enhancement option from among the set of enhancement options 910, and in response, the presentation module 302 of the enhancement system 124 generates and causes display of a collection of media items (e.g., the collection of media items 1010 of FIG. 10).

In some embodiments, in response to detecting an identification of an enhancement option from among the set of enhancement options 910, the presentation module 302 may cause display of an informational icon 915 that provides additional information about the enhancement option selected.

As an illustrative example, the first media 905 may comprise an image, and the enhancement option may include an option to add music to the image, such that display of the image results in the music being played.

FIG. 10 is an interface diagram 1000 depicting a GUI 1005 for enhancing media content, according to certain example embodiments. As seen the interface diagram 1000, the GUI 1005 comprises a presentation of a collection of media content 1010. For example, as discussed in the method 400 of FIG. 4, and the method 500 of FIG. 5, the presentation module 302 causes display of the collection of media content 1010 in response to receiving a request to enhance an image or video.

As seen in the interface diagram 1000, the collection of media content 1010 comprises a set of audio files that each have corresponding identification information. The identification information may for example include a title, an artist, album art work, as well as a visual representation of the audio (e.g., a waveform 1020). The collection of media content 1010 may be presented as a scrollable list, such that a user may scroll through the collection of media content 1010 to identify one or more media items.

In some embodiments, as discussed in the method 800 of FIG. 8, a user may record their own audio to be added to the collection of media content 1010. For example, the GUI 1005 may include a graphical icon 1025. A user may select the graphical icon 1025, and in response, the presentation module 302 may generate and cause display of the GUI 1105 as seen in the interface diagram 1100 of FIG. 11. Audio recorded by the user may then be displayed among the collection of media content 1010, in a section 1015 (i.e., "MY SOUNDS").

In some embodiments, to select a second media item 1030 from among the collection of media content 1010, a user may scroll the scrollable list until an identifier associated with the second media item 1030 is displayed at a position 1035 within the GUI 1005. In some embodiments, in response to detecting the identifier of the second media item 1030 at the position 1035, the presentation module 302 may retrieve and present a sample of the second media item 1030. Presenting the sample may include playing a portion of an audio file, as well as dynamically animating a waveform 1040 that represents the second media item 1030, based on audio data associated with the sample of the second media item 1030.

FIG. 11 is an interface diagram 1100 depicting an interface 1105 to record audio data, according to certain example embodiments. As seen in FIG. 11, the interface 1105 may be presented at the client device 102 in response to receiving a request to record audio data, as discussed in the method 800 of FIG. 8.

For example, in response to receiving a selection of the graphical icon 1025, as presented in FIG. 10, the presentation module 302 may cause display of the interface 1105. As seen in FIG. 11, the interface 1105 includes a display of an interface element 1120. In some embodiments, to record audio, a user may provide an input selecting the interface 1120, and in response the communication module 308 may record audio data.

In some embodiments, the presentation module 302 may cause display of a visualization 1110 of the recorded audio data, in response to the recording the audio data. A user may further provide inputs through the interface elements 1115 to shorten or select sections of the recorded audio. For example, a user may move positions of the interface elements 1115 along the visualization 1110 in order to select a portion of the recorded audio data depicted by the visualization 1110.

FIG. 12 is an interface diagram 1200 depicting a composite media 1205, according to certain example embodiments. As seen in FIG. 12, the composite media 1205 comprises a presentation of the first media 920, as seen in FIG. 9, and a graphical icon 120 that represents the second media selected by the user through the interface 1005 (e.g., the second media 1030).

As discussed in the method 700 of FIG. 7, in response to receiving a selection of the graphical icon 1210, the presentation module 302 generates and causes display of content 1215, wherein the content 1215 is associated with the second media that corresponds with the graphical icon 1210.

Software Architecture

Figure 13:
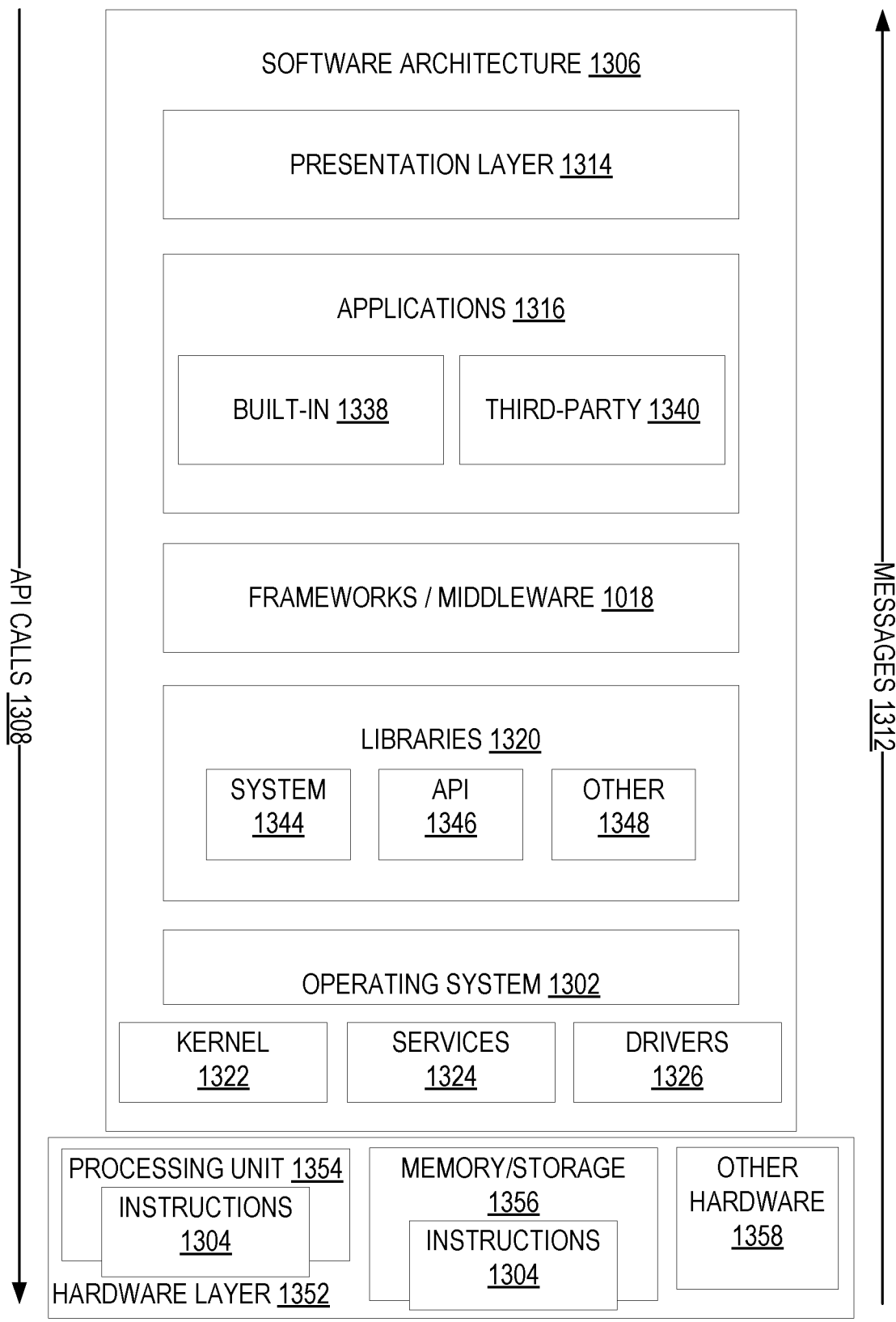
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as the machine 1400 of FIG. 14 that includes, among other things, processors 1404, memory 1414, and I/O components 1418. A representative hardware layer 1352 is illustrated and can represent, for example, the machine 1300 of FIG. 13. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
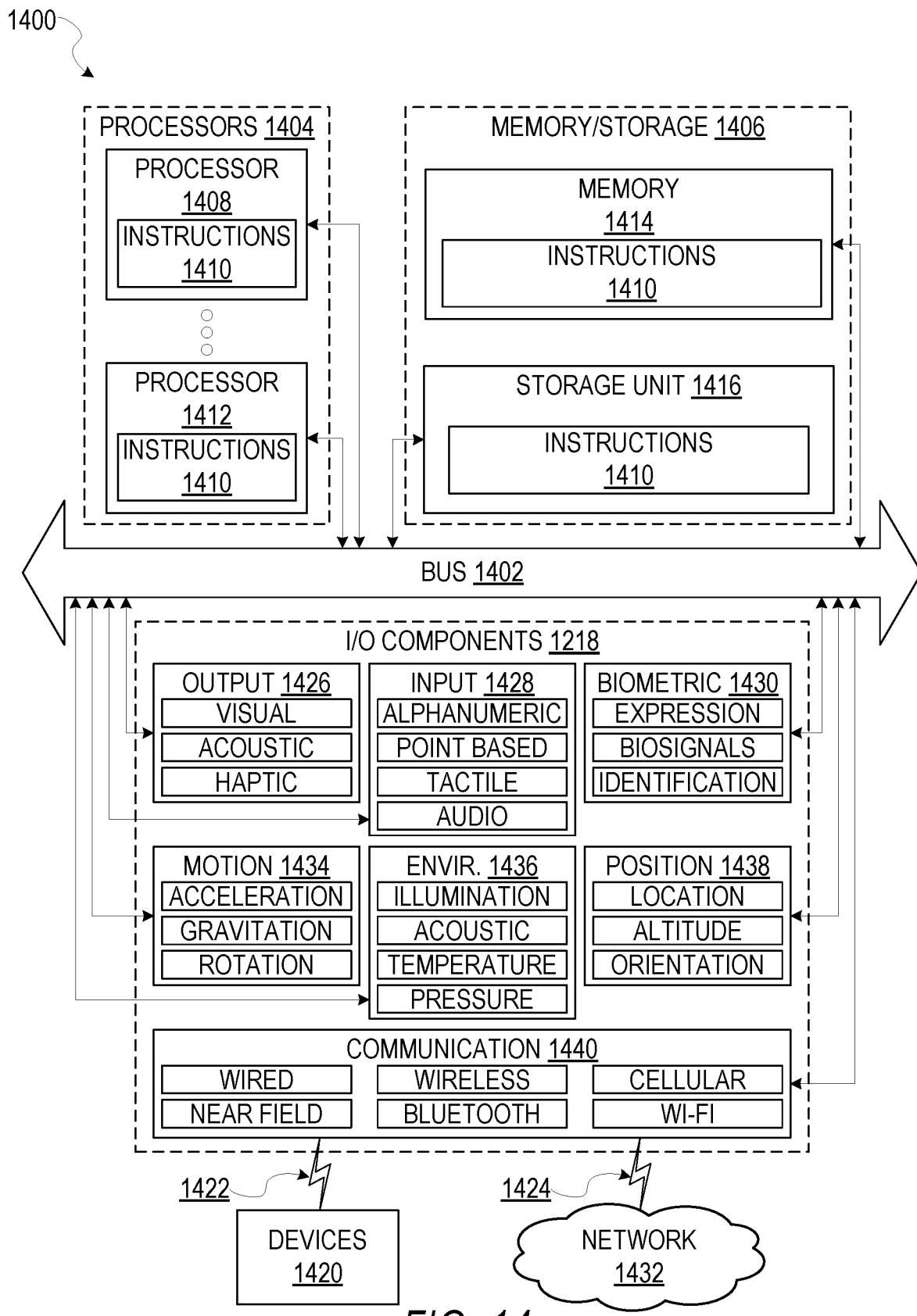
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A system comprising:
a memory; and
at least one hardware processor coupled to the memory and comprising instructions that causes the system to perform operations comprising:
causing display of a first media item within a graphical user interface, the first media item comprising at least image data;
receiving a request to enhance the image data of the first media item, the request comprising a selection of an enhancement option from among a set of enhancement options, the enhancement option corresponding with a media category from among a set of media categories;
curating a collection of media items in response to the request to enhance the image data, the collection of media items curated based on the media category that corresponds with the selection of the enhancement option, and a contextual factor that includes attributes of the image data of the first media item, the collection of media items including at least a second media item;
receiving an input that selects the second media item from among the collection of media items;
generating a composite media item based on the first media item and the second media item, the composite media item comprising at least a presentation of the first media item that includes a display of a graphical icon that represents the second media item at a location within the first media item; and
causing display of the composite media item at a client device.

2. The system of claim 1, wherein the contextual factor further includes one or more of user profile data, temporal data, and location data, and the instructions cause the system to perform operations further comprising:
presenting the collection of media items within the graphical user interface; and
receiving the input that selects the second media item via the graphical user interface.

3. The system of claim 2, wherein the second media item is an audio file that includes an identifier that identifies the audio file among the collection of media items, and wherein the presenting the collection of media items within the graphical user interface includes:
displaying a scrollable list at a position upon the first media item within the graphical user interface, the scrollable list comprising a set of identifiers that include at least the identifier that identifies the audio file.

4. The system of claim 2, wherein the receiving the selection of the second media from among the collection of media items includes:
receiving an identification of the second media from among the collection of media items;
presenting a sampling based on at least a portion of the second media item in response to the receiving the identification of the second media item; and
receiving an acceptance of the sampling.

5. The system of claim 2, wherein the second media item includes an audio file, and the receiving the input that selects the second media item from among the collection of media items further comprises:
receiving an identification of a portion of the audio file;
generating the second media item based on the portion of the audio file; and
wherein the generating the composite media is based on the first media item and the portion of the audio file.

6. The system of claim 1, wherein the input is a first input, and the instructions cause the system to perform operations further comprising:
receiving a second input that selects the graphical icon that represents the second media item from the client device; and
presenting content associated with the second media item at the client device in response to the receiving the second input that select the graphical icon that represents the second media item.

7. The system of claim 6, wherein the graphical icon is associated with a Uniform Resource Locator (URL) that references a web resource, and wherein the presenting the content associated with the second media item at the client device includes:
launching a browser at the client device in response to the receiving the second input that selects the graphical icon; and
navigating the browser to the web resource identified by the URL associated with the graphical icon.

8. The system of claim 1, wherein the selection of the second media item includes:
recording an audio file;
assigning an identifier to the audio file; and
generating the second media item based on the audio file and the identifier.

9. The system of claim 1, wherein the client device is a first client device, and the instructions cause the system to perform operations further comprising:
attaching the composite media item to a message to be delivered from the first client device to a second client device.

10. The system of claim 9, wherein the message includes an ephemeral message.

11. A method comprising
causing display of a first media item within a graphical user interface, the first media item comprising at least image data;
receiving a request to enhance the image data of the first media item, the request comprising a selection of an enhancement option from among a set of enhancement options, the enhancement option corresponding with a media category from among a set of media categories;
curating a collection of media items in response to the request to enhance the image data, the collection of media items curated based on the media category that corresponds with the selection of the enhancement option, and a contextual factor that includes attributes of the image data of the first media item, the collection of media items including at least a second media item;
receiving an input that selects the second media item from among the collection of media items;
generating a composite media item based on the first media item and the second media item, the composite media item comprising at least a presentation of the first media item that includes a display of a graphical icon that represents the second media item at a location within the first media item; and
causing display of the composite media item at a client device.

12. The method of claim 11, wherein the contextual factor includes one or more of user profile data, temporal data, and location data, and the method further comprises:
presenting the collection of media items within the graphical user interface; and
receiving the input that selects the second media item via the graphical user interface.

13. The method of claim 12, wherein the second media item is an audio file that includes an identifier that identifies the audio file among the collection of media items, and wherein the presenting the collection of media items within the graphical user interface includes:
displaying a scrollable list at a position upon the first media item within the graphical user interface, the scrollable list comprising a set of identifiers that include at least the identifier that identifies the audio file.

14. The method of claim 12, wherein the receiving the selection of the second media item from among the collection of media items includes:
receiving an identification of the second media item from among the collection of media items;
presenting a sampling based on at least a portion of the second media item in response to the receiving the identification of the second media item; and
receiving an acceptance of the sampling.

15. The method of claim 12, wherein the second media item includes an audio file, and the receiving the input that selects the second media item from among the collection of media items further comprises:
receiving an identification of a portion of the audio file;
generating the second media item based on the portion of the audio file; and
wherein the generating the composite media is based on the first media item and the portion of the audio file.

16. The method of claim 11, wherein the input is a first inputs, and the method further comprises:
receiving a second input that selects the graphical icon that represents the second media item from the client device; and
presenting content associated with the second media item at the client device in response to the receiving the second input that select the graphical icon that represents the second media item.

17. The method of claim 16, wherein the graphical icon is associated with a Uniform Resource Locator (URL) that references a web resource, and wherein the presenting the content associated with the second media item at the client device includes:
launching a browser at the client device in response to the receiving the second input that selects the graphical icon; and
navigating the browser to the web resource identified by the URL associated with the graphical icon.

18. The method of claim 11, wherein the receiving the request to augment the first media that includes the selection of the second media item further comprises:
recording an audio file;
assigning an identifier to the audio file; and
generating the second media item based on the audio file and the identifier.

19. The method of claim 11, wherein the client device is a first client device, and the instructions cause the system to perform operations further comprising:
attaching the composite media item to a message to be delivered from the first client device to a second client device.

20. A non-transitory machine-readable storage medium comprising instructions that, when executed by one or more processors of a machine, cause the machine to perform operations comprising:
causing display of a first media item within a graphical user interface, the first media item comprising at least image data;
receiving a request to enhance the image data of the first media item, the request comprising a selection of an enhancement option from among a set of enhancement options, the enhancement option corresponding with a media category from among a set of media categories;
curating a collection of media items in response to the request to enhance the image data, the collection of media items curated based on the media category that corresponds with the selection of the enhancement option, and a contextual factor that includes attributes of the image data of the first media item, the collection of media items including at least a second media item;
receiving an input that selects the second media item from among the collection of media items;
generating a composite media item based on the first media item and the second media item, the composite media item comprising at least a presentation of the first media item that includes a display of a graphical icon that represents the second media item at a location within the first media item; and
causing display of the composite media item at a client device.

* * * * *